United States Patent [19]
Ali et al.

[11] Patent Number: 5,731,392
[45] Date of Patent: Mar. 24, 1998

[54] STATIC CONTROL WITH TEOS

[75] Inventors: Ahmed H. Ali, Yanbu, Saudi Arabia; Steven M. Chranowski, Friendswood, Tex.; J. Greg Foster, Flemington; Thomas A. Geoghegan, Springfield, both of N.J.

[73] Assignee: Mobil Oil Company, Fairfax, Va.

[21] Appl. No.: 717,005

[22] Filed: Sep. 20, 1996

[51] Int. Cl.$^6$ ............................................. C08F 2/34
[52] U.S. Cl. ................................. 526/74; 526/81
[58] Field of Search ............................. 526/74, 81

[56] References Cited

U.S. PATENT DOCUMENTS

| | | | |
|---|---|---|---|
| 4,532,311 | 7/1985 | Fulks et al. | 526/74 |
| 4,803,251 | 2/1989 | Goode et al. | 526/74 |
| 4,876,320 | 10/1989 | Fulks et al. | 526/74 |
| 5,244,853 | 9/1993 | Wang et al. | 502/116 |
| 5,336,652 | 8/1994 | Mink et al. | 502/125 |
| 5,391,657 | 2/1995 | Song et al. | 526/74 |
| 5,470,812 | 11/1995 | Mink et al. | 502/125 |

FOREIGN PATENT DOCUMENTS

| | | |
|---|---|---|
| 0 261 808 | 8/1987 | European Pat. Off. . |

*Primary Examiner*—Thomas R. Weber
*Attorney, Agent, or Firm*—Marina V. Schneller; Dennis P. Santini

[57] ABSTRACT

A process for maintaining the electrostatic charges substantially at neutral levels thereby reducing or avoiding sheeting in a fluid bed gas phase olefin polymerization reactor.

8 Claims, 1 Drawing Sheet

STATIC CONTROL WITH TEOS

BACKGROUND OF THE INVENTION

Low pressure production of polyethylene is conducted at pressures less than 1000 psi. Processes for low pressure production of polyethylene include fluid bed gas phase reactor polymerization at pressures of less than 1000 psi, preferably less than 400 psi, commercially usually in the range of 100 to 350 psi. Beth low density, specifically linear low density [LLDPE, density of less than 0.94] and high density [density of greater than 0.94] can be produced in the fluid bed gas phase reactor.

Sheeting with reactor shutdown can occur in the fluid bed reactor. Sheeting is the production of layers of polymeric material at the reactor wall(s). At least one theory of rationalizing the occurrence of sheeting is based on the generation of electrostatic charge(s) in the reactor as a consequence of polymerization conditions. Generation of both negative and positive electrostatic charge build up can be correlated with sheeting. Generation of both negative and positive electrostatic charge build up is also reflected by temperature deviations in the reactor. The sheets are relatively large of a thickness ranging from about ¼ to ½ inch. These sheets may range from a few square inches to several square feet. It seems that the electrostatic activity continues to increase with increasing sheeting severity. This acceleration may be due to the lack of cooling at the wall and the generation of hot-spots. These hot-spots would tend to melt and fuse the resin into larger sheets.

SUMMARY OF THE INVENTION

The invention relates to a process for reducing sheeting during polymerization [or copolymerization] in the fluid bed gas phase reactor and for reducing negative static. Under fluid bed gas phase polymerization conditions, sheeting may occur. If positive static occurs in the gas phase reactor water addback is currently used to neutralize positive static. The invention particularly relates to neutralizing negative static. The process of the invention comprises feeding 16 to 40 ppm of tetraethylorthosilicate (based on the ethylene feed stream) as a cofeed to a fluid bed reactor to reduce negative static. The tetraethylorthosilicate actually induces positive static. Tetraethylorthosilicate and water addback can act as a complimentary pair of reagents to neutralize reactor static and reduce sheeting in the gas phase reactor.

Accordingly, the process of the invention for reducing sheeting in a gas phase fluidized bed reactor comprises determining the electrostatic levels in the reactor; when negative electrostatic levels are indicated then adding a positive charge inducing quantity of tetraethylorthosilicate; when positive electrostatic levels are indicated, adding a negative charge inducing quantity of a negative charge inducing reagent; and continuing to monitor the electrostatic charge in the reactor to create and maintain neutral static charge in said reactor.

BRIEF DESCRIPTION OF THE DRAWING(S)

The FIGURE is a schematic drawing of a fluidized bed gas phase reactor which can be used in the process of the invention.

DETAILED DESCRIPTION:

Conditions in the Fluid Bed Reactor

Figure 1:
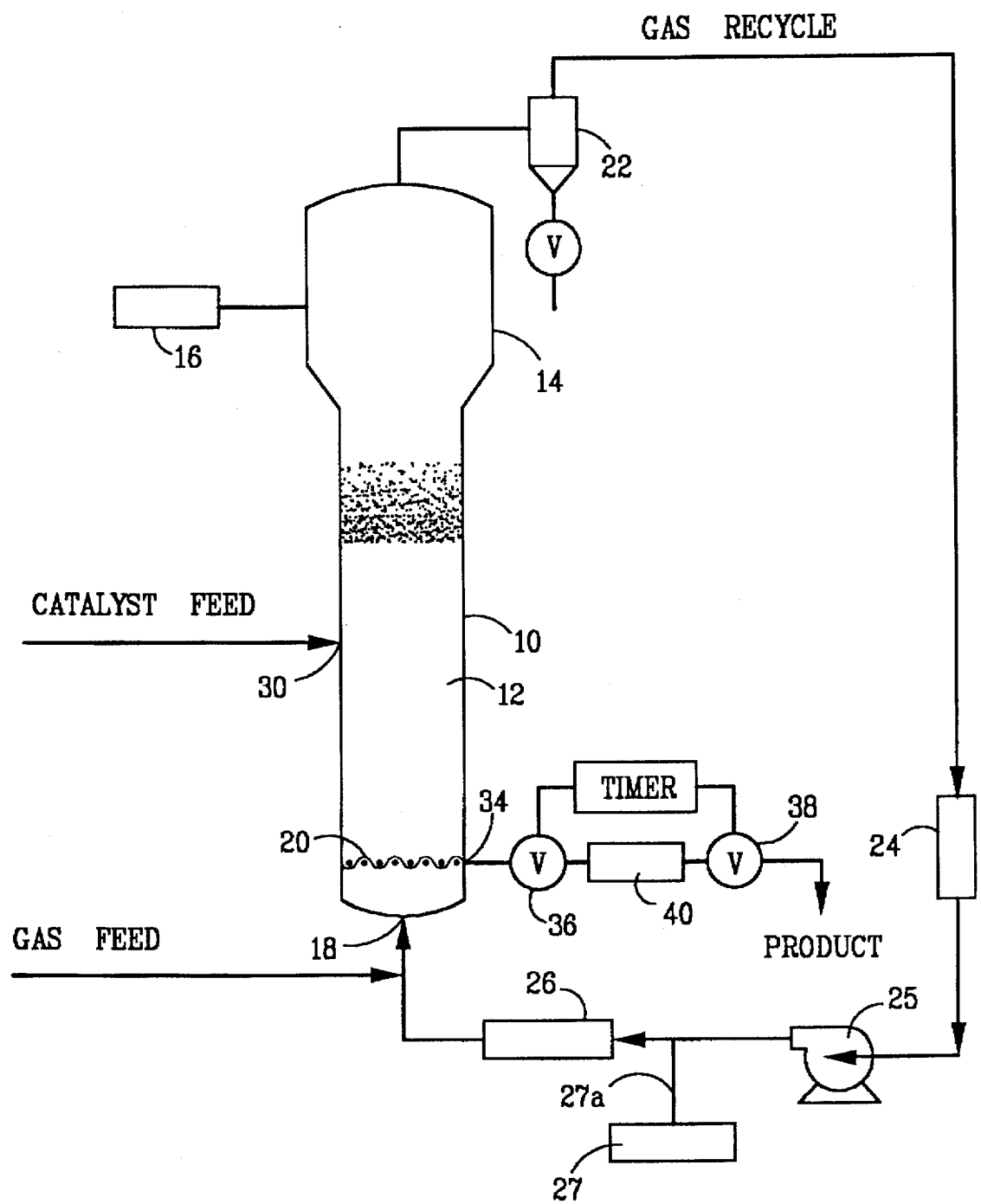

Ethylene polymers, as well as copolymers of ethylene with one or more $C_3$–$C_{10}$ alpha-olefins, such as propylene, butene-1, pentene-1, hexene-1, can be produced in accordance with the invention. Thus, copolymers having two monomeric units are possible as well as terpolymers having three monomeric units. Particular examples of such polymers include ethylene/1-butene copolymers, ethylene/1-hexene copolymers and ethylene/4-methyl-1-pentene copolymers. Ethylene/1-butene and ethylene/1-hexene copolymers are the most preferred copolymers polymerized in the process of and with the catalyst of this invention. The ethylene copolymers produced in accordance with the present invention preferably contain at least about 80 percent by weight of ethylene units.

Hydrogen may be used as a chain transfer agent in the polymerization reaction of the present invention. The ratio of hydrogen/ethylene employed will vary between about 0 to about 2.0 moles of hydrogen per mole of ethylene in the gas phase. Any gas inert to the catalyst and reactants can also be present in the gas stream.

A fluidized bed reaction system which can be used in the practice of the process of the present invention is illustrated schematically in FIG. 1. With reference thereto, the reactor 10 consists of a reaction zone 12, a velocity reduction zone 14 and the distributor plate 20. Although fouling can occur in all of the cold areas (areas in a reactor at a temperature which is less than the temperature at which any component (s), in the gas phase reactor are liquid rather than gaseous) distributor plate fouling is the one most easily detected, since it results in a rapid increase in the pressure drop across the distributor plate due to flow restriction. Such flow restrictions also result in changing fluidization patterns and contribute to reactor wall fouling. The lowest temperature in the reactor loop is in the reactor inlet beneath the distributor plate. Other areas representing the coldest sections in the fluid bed reactor system include the cooler and piping between the cooler and the bottom head.

The reaction zone 12 comprises a bed of growing polymer particles and a minor amount of catalyst particles fluidized by the continuous flow of polymerizable and modifying gaseous components. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", *Chemical Engineering Progress Symposium Series*, Vol. 62, p. 100–111 (1966). The distribution plate 20 serves the purpose of diffusing recycle gas through the bed at a rate sufficient to maintain fluidization at the base of the bed. Fluidization is achieved by a high rate of gas recycle to and through the bed, typically in the order of about 50 times the rate of feed of make-up gas. Make-up gas is fed to the bed at a rate equal to the rate at which particulate polymer product is formed by reaction. The composition of the make-up gas is determined by a gas analyzer 16 positioned above the bed. The composition of the make-up gas is continuously adjusted to maintain an essentially steady state gaseous composition within the reaction zone.

The portion of the gas stream which does not react in the bed (the recycle gas) passes a velocity reduction zone 14 where entrained particles are given an opportunity to drop back into the bed, through a cyclone 22, through a filter 24 (optionally) and is compressed in a compressor 25, passes through a heat exchanger 26 and is returned to the bed. The distribution plate 20 serves the purpose of diffusing recycle gas through the bed at a rate sufficient to maintain fluidization. The plate may be a screen, slotted plate, perforated plate, a plate of the bubble cap type, and the like.

The fluid bed reactor is operated at a temperature below the sintering temperature of the polymer particles. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a point above the distribution plate at a rate equal to its consumption. Since the catalysts used in the fluid bed are highly active, injection of the fully activated catalyst into the area below the distribution plate may cause polymerization to begin there and eventually cause plugging of the distribution plate. Injection into the bed, instead, aids in distributing the catalyst throughout the bed and precludes the formation of localized spots of high catalyst concentration.

The production rate of polymer in the bed is controlled by the rate of catalyst injection. Since any change in the rate of catalyst injection changes the rate of generation of the heat of reaction, the temperature of the recycle gas is adjusted to accommodate the change in rate of heat generation. Complete instrumentation of both the fluidized bed and the recycle gas cooling system is, of course, necessary to detect any temperature change in the bed so as to enable the operator to make a suitable adjustment in the temperature of the recycle gas.

Since the rate of heat generation is directly related to product formation, a measurement of the temperature rise of the gas across the reactor (the difference between inlet gas temperature and exit gas temperature) is determinative of the rate of particulate polymer formation at a constant gas velocity. Under a given set of operating conditions, the fluidized bed is maintained at essentially a constant height by withdrawing a portion of the bed as product at a rate equal to the rate of formation of the particulate polymer product.

The catalyst used for catalytic polymerization in the fluid bed reactor may constitute a significant factor in static build up and sheeting since the catalyst may induce charge build up. The catalysts are usually titanium and/or vanadium containing catalysts. These catalysts are supported, usually on silica, silica/alumina, alumina or magnesium oxide. Catalysts which are reported to induce negative static in the fluid bed gas phase reactor are described in U.S. Pat. No. 4,803,251 at column 2 through column 5, and in Example 3 of U.S. Pat. No. 4,803,251, each of which portions of U.S. Pat. No. 4,803,251 is relied upon and incorporated by reference herein. Such negative static can result in sheeting, described above. With the catalysts of U.S. Pat. No. 4,803,251 it has been found that contaminants such as oxygen/oxidized chemicals cause an increase in positive static while water induces a negative charge. The negative static is measurable in the reactor by monitoring the voltage on a metal spike that is insulated with ceramics and wired to an amp meter. This design is similar to an Auburn Triboflow meter that is available commercially. By comparison, it has been discovered that oxidized hexene (carbonyls/peroxides) and water do not significantly effect reactor static with the catalyst system of U.S. Pat. No. 5,336,652 and U.S. Pat. No. 5,470,812. The gas phase fluid bed polymerizations with these catalysts, are less prone to sheeting. These U.S. Pat. Nos. 5,336,652 and 5,470,812 are expressly incorporated by reference herein. A catalyst produced in accordance with those patents and containing 0.69 mmol/g TEOS (tetraethylorthosilicate) has demonstrated excellent reactor continuity and a low static baseline (0.0–+0.5 nA) in the gas phase reactor. However, when the TEOS loading is lowered to 0.44 mmol/g of silica, reactor static averages 2–4 nA. From this trend, it was decided to test whether TEOS would also neutralize positive static in the gas phase reactor for other catalyst systems.

The static in the reactor is measured by a metal spike that is insulated with ceramic materials and wired to an amp meter. This is similar to a commercially available Triboflow meter from Auburn.

A numerical value of 2 nA to 4 nA [static] is sufficient to require use of the process of the invention. Our experimentation confirmed TEOS (tetraethyl orthosilicate) will induce positive static in the gas phase reactor.

Currently, water addback is used to control positive static. TEOS and water addback are viewed as a complimentary pair for neutralizing static and minimizing sheeting in the gas phase reactor.

The amount of TEOS addback can vary from 16 to 40 PPM, preferably from 16 ppm to 30 ppm, more preferably from 20 ppm to 30 ppm and most preferably from 22 ppm to 25 ppm. Addback is effected by introducing the TEOS as a cofeed similar to alkyl. It is injected as a liquid into the recycle stream where it vaporizes and travels into the reactor as a gas. A geed of 16–40 ppm is based upon the ethylene feed stream to the reactor.

When the reactor monitoring determines positive static build up in the reactor an amount of a reagent effective to neutralize build up is fed to the reactor. Currently, we utilize water addback at levels from up to 10 ppm to control positive static [What is basis of ppm??]. However, other reagents can be used such as ketones of 1 to 8 carbon atoms. These additives are based upon ethylene feed to the reactor. Although not to be bound by the theory, we have developed the following theory to explain the sheeting mechanism. A static charge is generated and concentrated by the frictional contact of the two dissimilar materials; polyethylene resin and carbon steel. Each charged resin granule in the fluidized bed sets up an individual electric field. This field strength increases from zero at the axis to a maximum at the wall.

This axially directed electrostatic force constantly competes with the fluidizing force which tends to randomly distribute the bed. When the bed charges produce a high enough electric field, particle movement is hindered at the wall. This partial fluidization loss results in flat polymer masses being formed at the wall due to insufficient cooling.

EXAMPLES

The TEOS was diluted with isopentane and fed downstream into the bottom head of the reactor. We evaluated a range of TEOS levels from 0.25 to 40 ppm. Static trended upwards each time TEOS was fed to the reactor, and this trend was reproduced several times. Higher TEOS feedrates resulted in increasingly higher static levels. The table below summarizes the positive static charge induced by the various TEOS levels.

| TEOS FEED (ppm) | DURATION (min) | STATIC CHARGE (nA) |
| --- | --- | --- |
| 0.24 | 40 | 0.5 |
| 0.48 | 40 | 0.5 |
| 2.40 | 40 | 0.7 |
| 16.00 | 40 | 0.9 |
| 40.00 | 60 | 1.5 |

The static baseline without TEOS feed was between 0.0 to 0.5 nA. As the TEOS feed was increased, static increased to 0.9 nA at 16 ppm and then to 1.5 nA at 40 ppm. As soon as the TEOS feed was stopped, static would decline over a thirty-minute period and eventually stabilize near baseline (0.0–0.5 nA). All tests were done with M-1 40/20 and T-4. An MI 40/20 formulation is based on 0.40 mole ratio of DEAC to THF in the M-1 simp formulation and an 0.20 molar ratio of TEAL to THF in the M-1 SIMP at high film strength conditions. Between 0.25 to 40.0 ppm, the TEOS did not affect catalyst activity, process responses, or MFR.

Thus it is apparent that there has been provided, in accordance with the invention, a process, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for reducing sheeting in an operating gas phase fluidized bed olefin polymerization reactor, under olefin polymerization conditions, wherein the method comprises monitoring electrostatic level in the reactor,
wherein the electrostatic level can be neutral, positive or negative;
maintaining said conditions under which a negative electrostatic level develops in the reactor;
feeding to the reactor a positive charge inducing quantity of a reagent selected from the group consisting of tetraethylorthosilicate, tetrapropyl orthosilicate and tetra butylorthosilicate and neutralizing said electrostatic level.

2. The process of claim 1, wherein the reagent is tetraethylorthosilicate.

3. The method of claim 1 wherein the quantity of tetraalkylorthosilicate ranges from 16 ppm to 40 ppm.

4. The method of claim 1 wherein the reagent is supported on silica.

5. The method of claim 1 wherein the silicate is selected from the group consisting of tetramethylorthosilicate, tetrapropyl orthosilicate and tetra butylorthosilicate.

6. The method of claim 1, wherein the silicate is fed to the reactor below a distributor plate in said reactor.

7. The method of claim 1, wherein the silicate is supported on a silica support.

8. The method of claim 1, which further includes a generation of a positive electrostatic level in the reactor and cofeeding an amount of a reagent effective to control said electrostatic level.

* * * * *